(12) United States Patent
Yun et al.

(10) Patent No.: US 11,937,158 B2
(45) Date of Patent: Mar. 19, 2024

(54) METHOD FOR LOCATING EXTERNAL ELECTRONIC DEVICE AND ELECTRONIC DEVICE THEREFOR

(71) Applicant: Samsung Electronics Co., Ltd., Suwon-si (KR)

(72) Inventors: Sangchul Yun, Suwon-si (KR); Doosuk Kang, Suwon-si (KR); Gyujin Lee, Suwon-si (KR); Jubyung Lee, Suwon-si (KR); Wonkyoung Jang, Suwon-si (KR); Junwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/685,287

(22) Filed: Mar. 2, 2022

(65) Prior Publication Data

US 2022/0286830 A1    Sep. 8, 2022

Related U.S. Application Data

(63) Continuation of application No. PCT/KR2022/002904, filed on Mar. 2, 2022.

(30) Foreign Application Priority Data

Mar. 2, 2021    (KR) .......................... 10-2021-0027277

(51) Int. Cl.
*H04W 4/80*    (2018.01)
(52) U.S. Cl.
CPC .................................... *H04W 4/80* (2018.02)

(58) Field of Classification Search
CPC ...................................................... H04W 4/80
See application file for complete search history.

(56) References Cited

U.S. PATENT DOCUMENTS 8,989,053 B1    3/2015    Skaaksrud et al.
9,182,231 B2    11/2015    Skaaksrud
(Continued)

FOREIGN PATENT DOCUMENTS

KR    100872071 B1    12/2008
KR    10-2016-0028703 A    3/2016
(Continued)

OTHER PUBLICATIONS

International Search Report of the International Searching Authority dated Jun. 14, 2022, in connection with International Application No. PCT/KR2022/002904, 5 pages.

*Primary Examiner* — David Bilodeau

(57) ABSTRACT

An electronic device is configured to receive at least one advertisement (ADV) packet from an external electronic device using the wireless communication circuit. The electronic device is configured to determine whether to upload identification information of the first external electronic device based on at least one of information of a channel through which the at least one ADV packet is received or information of the external electronic device included in the at least one ADV packet. The electronic device is configured to transmit the identification information of the external electronic device and location information of the electronic device to an external server device, in response to a determination to upload the identification information. In addition to the above, various embodiments identified through the disclosure are possible.

20 Claims, 12 Drawing Sheets

(56) References Cited

U.S. PATENT DOCUMENTS

| | | |
|---|---|---|
| 9,525,971 B1 | 12/2016 | Vega et al. |
| 9,685,066 B2 | 6/2017 | Vega et al. |
| 9,973,890 B2 | 5/2018 | de la Broise |
| 9,973,893 B2 | 5/2018 | Evans et al. |
| 10,021,516 B2 | 7/2018 | Farley et al. |
| 10,068,457 B2 | 9/2018 | Vega et al. |
| 10,111,032 B2 | 10/2018 | Vega et al. |
| 10,117,129 B2 | 10/2018 | Jung et al. |
| 10,187,750 B2 | 1/2019 | Evans et al. |
| 10,412,548 B2 | 9/2019 | Vega et al. |
| 10,993,075 B2 | 4/2021 | Vega et al. |
| 11,138,844 B2 | 10/2021 | Kim et al. |
| 11,251,887 B2 | 2/2022 | Chae et al. |
| 2015/0154539 A1 | 6/2015 | Skaaksrud et al. |
| 2015/0156718 A1 | 6/2015 | Skaaksrud |
| 2017/0243469 A1 | 8/2017 | Vega et al. |
| 2017/0332196 A1 | 11/2017 | Farley et al. |
| 2020/0019928 A1 | 1/2020 | Skaaksrud |
| 2020/0035076 A1 | 1/2020 | Kim et al. |
| 2020/0045497 A1* | 2/2020 | Kang ............... H04W 4/21 |
| 2020/0304946 A1 | 9/2020 | Vega et al. |

FOREIGN PATENT DOCUMENTS

| | | |
|---|---|---|
| KR | 10-2017-0034201 A | 3/2017 |
| KR | 10-1722219 B1 | 4/2017 |
| KR | 10-2019-0098320 A | 8/2019 |
| KR | 10-2019-0106862 A | 9/2019 |
| KR | 10-2068174 B1 | 1/2020 |
| KR | 10-2022-0109711 A | 8/2022 |
| KR | 10-2022-0139317 A | 10/2022 |

* cited by examiner

METHOD FOR LOCATING EXTERNAL ELECTRONIC DEVICE AND ELECTRONIC DEVICE THEREFOR

CROSS-REFERENCE TO RELATED APPLICATIONS

This application is a Bypass Continuation of International Application No. PCT/KR2022/002904, filed Mar. 2, 2022, which claims priority to Korean Patent Application No. 10-2021-0027277, filed Mar. 2, 2021, the disclosures of which are herein incorporated by reference in their entirety.

BACKGROUND

1. Field

Various embodiments disclosed in the disclosure relate to a method for locating an external electronic device and an electronic device thereof.

2. Description of Related Art

Various devices are used to track the location of a person or object. The location of a person or object associated with an electronic device may be tracked using an electronic device such as a tracker or mobile phone. For example, the electronic device may be configured to acquire its own location information using a global positioning system (GPS) and transmit the acquired location information to a specified server. In this case, the electronic device may include a positioning circuit for acquiring its own location information and a circuit for supporting wireless communication for Internet access. Accordingly, the size and power consumption of the electronic device may be increased.

An electronic device having a relatively small size, such as earbuds, may not include a positioning circuit or an Internet access function. The electronic device may be a device of a relatively small size that supports short-range wireless communication. For example, the electronic device may be a small electronic device that can be attached to an object or carried by a person. For example, the electronic device may be attached to a keychain or inserted into a wallet or pocket.

In order to track the location of the electronic device, an electronic device tracking method using a companion device of the electronic device may be used. For example, for tracking an electronic device such as earbuds, a mobile phone associated with the electronic device may be used as a companion device. The electronic device may communicate using short-range wireless communication. The electronic device may be assumed to be adjacent to the companion device while the electronic device and the companion device are connected to each other.

When the connection with the companion device is cut off, the electronic device may be assumed to be in a lost state. The electronic device broadcasts its own information from the companion device to the peripheral devices so that the peripheral devices report location information to a server. For example, the peripheral devices may report the received information of the electronic device to the server together with their own location information. The server may identify the location of the electronic device based on the received location information of the peripheral devices, and transmit the identified location of the electronic device to the companion device of the electronic device.

SUMMARY

When the electronic device is in a lost state, the electronic device may continuously consume current to broadcast (e.g., advertise) information of the electronic device. If the electronic device has a relatively small battery capacity, the electronic device may be completely discharged before being connected with the companion device. In this case, the probability that the owner of the companion device may find the electronic device may be reduced.

In addition, a peripheral device (e.g., a helper device) that has received the information of the electronic device may consume currents to upload the information of the electronic device to the server. Furthermore, in order to acquire location information of the peripheral device, the peripheral device may consume currents.

Furthermore, the server may receive information of the electronic device and location information of a plurality of peripheral devices from the peripheral devices. For example, information received from a plurality of peripheral devices may be substantially the same information. This may make the load on the server increased. In addition, an increase in the load on the server may cause an increase in cost, such as securing an additional server for smooth service provision.

Various embodiments disclosed in the disclosure may provide an electronic device and a method for solving the above-described problems.

According to an aspect of the disclosure, there is provided an electronic device including a first wireless communication circuit configured to perform short-range wireless communication, a second wireless communication circuit, a processor, and a memory, in which the memory stores instructions that, when executed by the processor, cause the electronic device to receive at least one advertisement (ADV) packet from an external electronic device using the first wireless communication circuit, determine whether to upload identification information of the external electronic device based on at least one of information of a channel through which the at least one ADV packet is received or information of the external electronic device included in the at least one ADV packet, and transmit the identification information of the external electronic device and location information of the electronic device to an external server device using the second wireless communication circuit, in response to the determination to upload the identification information.

According to another aspect of the disclosure, there is provided a method for transmitting information of an external electronic device by an electronic device, the method including receiving at least one advertisement (ADV) packet from the external electronic device through short-range wireless communication, determining whether to upload identification information of the external electronic device based on at least one of information of a channel through which the at least one ADV packet is received or information of the external electronic device included in the at least one ADV packet, and transmitting the identification information of the external electronic device and location information of the electronic device to an external server device, in response to the determination to upload the identification information.

With the electronic device in a lost state according to an embodiment disclosed in the disclosure, current consumption is reduced by controlling an advertising (ADV) operation in the lost state.

With the peripheral electronic device according to an embodiment disclosed in the disclosure, power consumption of the peripheral electronic device is reduced by determining whether to upload information of the lost electronic device based on a specified condition.

With the peripheral electronic device according to an embodiment disclosed in the disclosure, a server load is reduced by uploading information of the lost electronic device based on a specified condition.

Besides, various effects may be provided that are directly or indirectly understood through the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With respect to the description of the drawings, the same or similar reference signs may be used for the same or similar elements.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments disclosed in the disclosure will be described with reference to the accompanying drawings. However, this is not intended to limit the disclosure to the specific embodiments, and it is to be construed to include various modifications, equivalents, and/or alternatives of embodiments of the disclosure.

Figure 1:
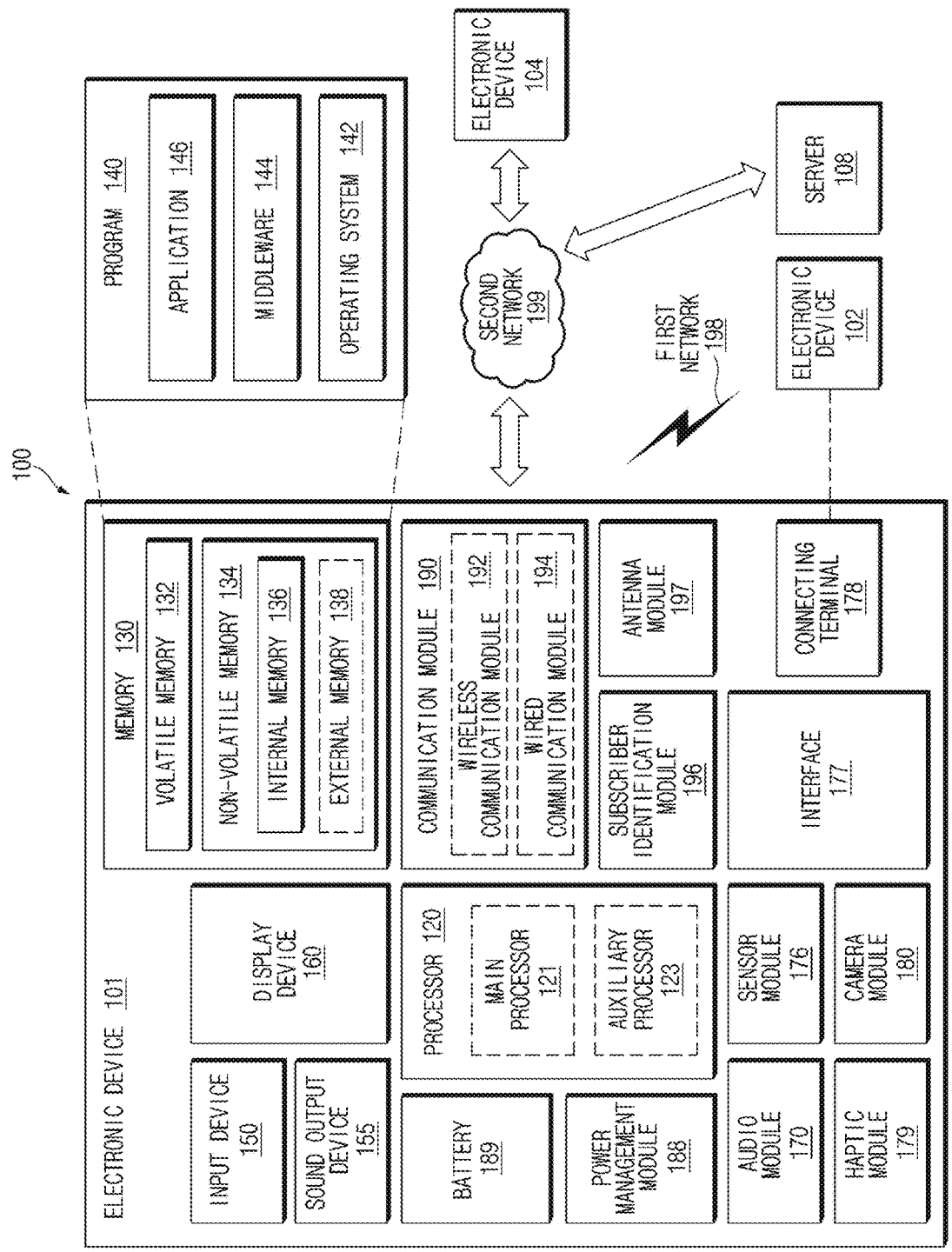
FIG. 1 illustrates an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
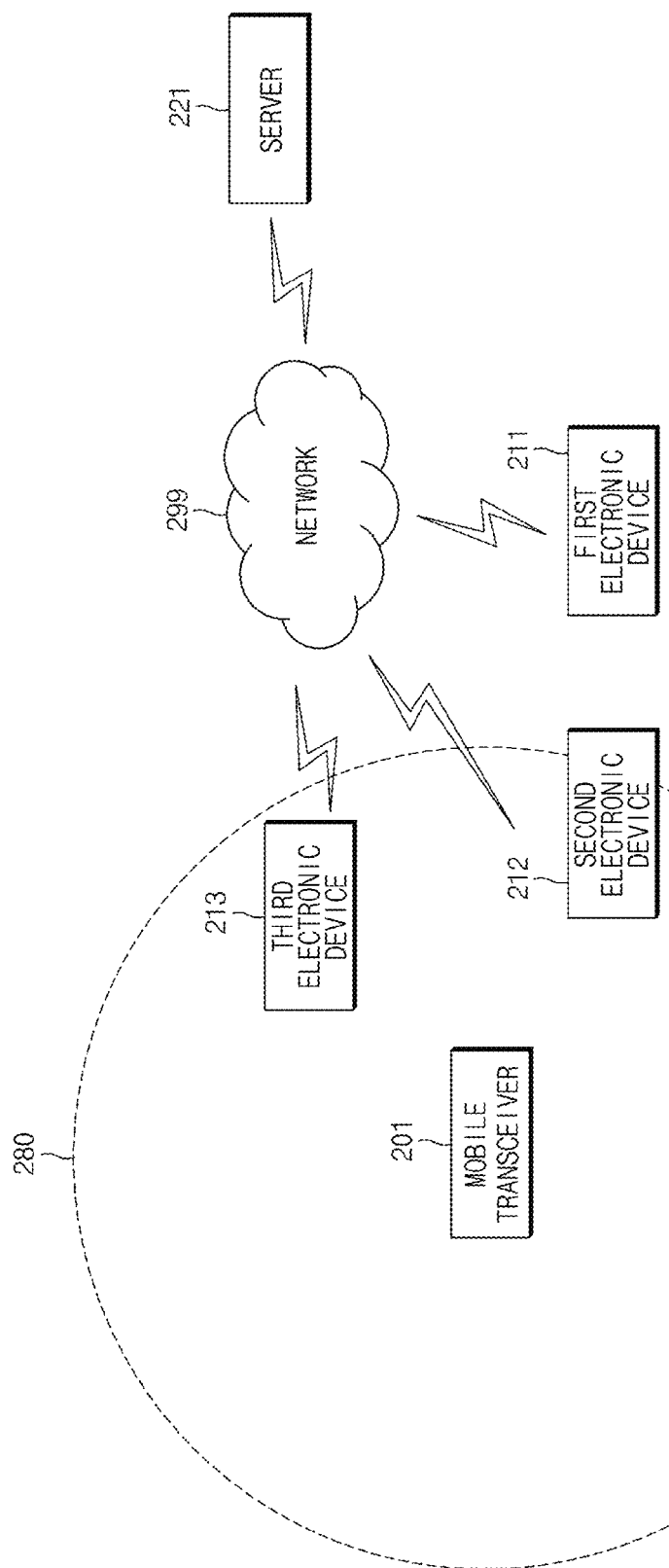
FIG. 2 illustrates a lost environment of a mobile transceiver according to an example.

FIG. 2 illustrates a lost environment of a mobile transceiver according to an example.

Referring to FIG. 2, operations according to embodiments of the disclosure are schematically described. Each of a mobile transceiver 201, a first electronic device 211, a second electronic device 212, and a third electronic device 213 may be an electronic device having a configuration similar to that of the electronic device 101 of FIG. 1. The mobile transceiver 201 may be any electronic device that supports short-range wireless communication (e.g., Bluetooth (e.g., Bluetooth legacy and/or Bluetooth low energy (BLE)), neighbor awareness network (NAN), Wi-Fi™ Direct, and/or ultrawide band (UWB)). For example, the mobile transceiver 201 may be a smartphone, laptop, car key, tracker, earbuds, camera, smart watch, or stylus. Each of the first electronic device 211, the second electronic device 212, and the third electronic device 213 may be an electronic device that supports wireless communication (e.g., cellular communication and/or WLAN) for short-range wireless communication and Internet access. For example, each of the first electronic device 211, the second electronic device 212, and the third electronic device 213 may be a mobile phone, a user device, or any portable terminal. Each of the first electronic device 211, the second electronic device 212, and the third electronic device 213 is connected to a server 221 (e.g., the server 108 of FIG. 1) via a network 299 (e.g., the second network 199 of FIG. 1).

In the example of FIG. 2, the mobile transceiver 201 may be a device associated with the first electronic device 211. For example, the mobile transceiver 201 may be an electronic device owned by the user of the first electronic device 211. The mobile transceiver 201 may be an electronic device paired with the first electronic device 211. The mobile transceiver 201 may be a device configured to transmit and receive data through short-range wireless communication with the first electronic device 211. Communication between the mobile transceiver 201 and the first electronic device 211 may be described later with reference to FIG. 4.

For example, if the mobile transceiver 201 moves away from the first electronic device 211, the first electronic device 211 may be located outside a short-range wireless communication coverage 280 of the mobile transceiver 201. As the first electronic device 211 is located outside the coverage 280, the mobile transceiver 201 may not be able to communicate with the first electronic device 211. According to an embodiment, the mobile transceiver 201 may determine state information of the mobile transceiver 201 as a lost state, based on the failure to receive a signal from the first electronic device 211 and location information of the mobile transceiver 201. A method of determining the mobile transceiver 201 as the lost state may be described later with reference to FIG. 5.

In the lost state, the mobile transceiver 201 may broadcast (e.g., advertise) information of the mobile transceiver 201 to peripheral devices (e.g., the second electronic device 212 and the third electronic device 213) using short-range wireless communication. The peripheral devices may receive the information of the mobile transceiver 201.

According to an embodiment, each of the peripheral devices may determine whether to upload the received information of the mobile transceiver 201 to the server 221. For example, each of the peripheral devices may determine whether to upload information based on a user setting and/or information of the mobile transceiver 201. Operations related to information upload of the mobile transceiver 201 by the peripheral devices may be described later with reference to FIGS. 6 to 12. If the peripheral device determines to upload the information of the mobile transceiver 201, the peripheral device may upload the information of the mobile transceiver 201 to the server 221. For example, the second electronic device 212 may determine to upload information of the transceiver 201. In this case, the second electronic device 212 may upload the information of the mobile transceiver 201 received from the mobile transceiver 201 and location information of the second electronic device 212 to the server 221.

The server 221 may transmit the received location information of the second electronic device 212 to the first electronic device 211 as the location of the mobile transceiver 201. For example, the server 221 may use the information received from the second electronic device 212 (e.g., identification information of the mobile transceiver 201) to identify the first electronic device 211 linked to the mobile transceiver 201. The server 221 may have a database including information on at least one electronic device (e.g., the first electronic device 211) linked to the first electronic device 211. The server 221 may identify the first electronic device 211 by searching the database using the identification information of the mobile transceiver 201. The server 221 may transmit the location information of the second electronic device 212 and information of the mobile transceiver 201 to the first electronic device 211.

The first electronic device 211 may provide the location of the mobile transceiver 201 to the user using the information received from the server 221. For example, the first electronic device 211 may display a user interface indicating the location of the mobile transceiver 201 based on the received location information. The user of the first electronic device 211 may move to a location adjacent to the mobile transceiver 201 using the received location of the mobile transceiver 201.

After communication with the mobile transceiver 201 is disconnected, the first electronic device 211 may periodically transmit a signal for searching for the mobile transceiver 201. As the first electronic device 211 moves within the coverage 280 of the mobile transceiver 201, the mobile transceiver 201 may receive the signal from the first electronic device 211. In response to the reception of the signal, the connection between the mobile transceiver 201 and the first electronic device 211 may be restored. For example, the mobile transceiver 201 may provide a notification to the user by providing a visual, tactile, and/or audible notification in response to reception of the signal from the first electronic device 211.

As described above with reference to FIG. 2, peripheral devices may optionally upload information of the mobile transceiver 201 to the server 221. Accordingly, signal transmission for uploading by the peripheral devices may be reduced, and the load of the server 221 may be reduced. Hereinafter, embodiments of the disclosure will be described in more detail with reference to FIGS. 3 to 12.

Figure 3:
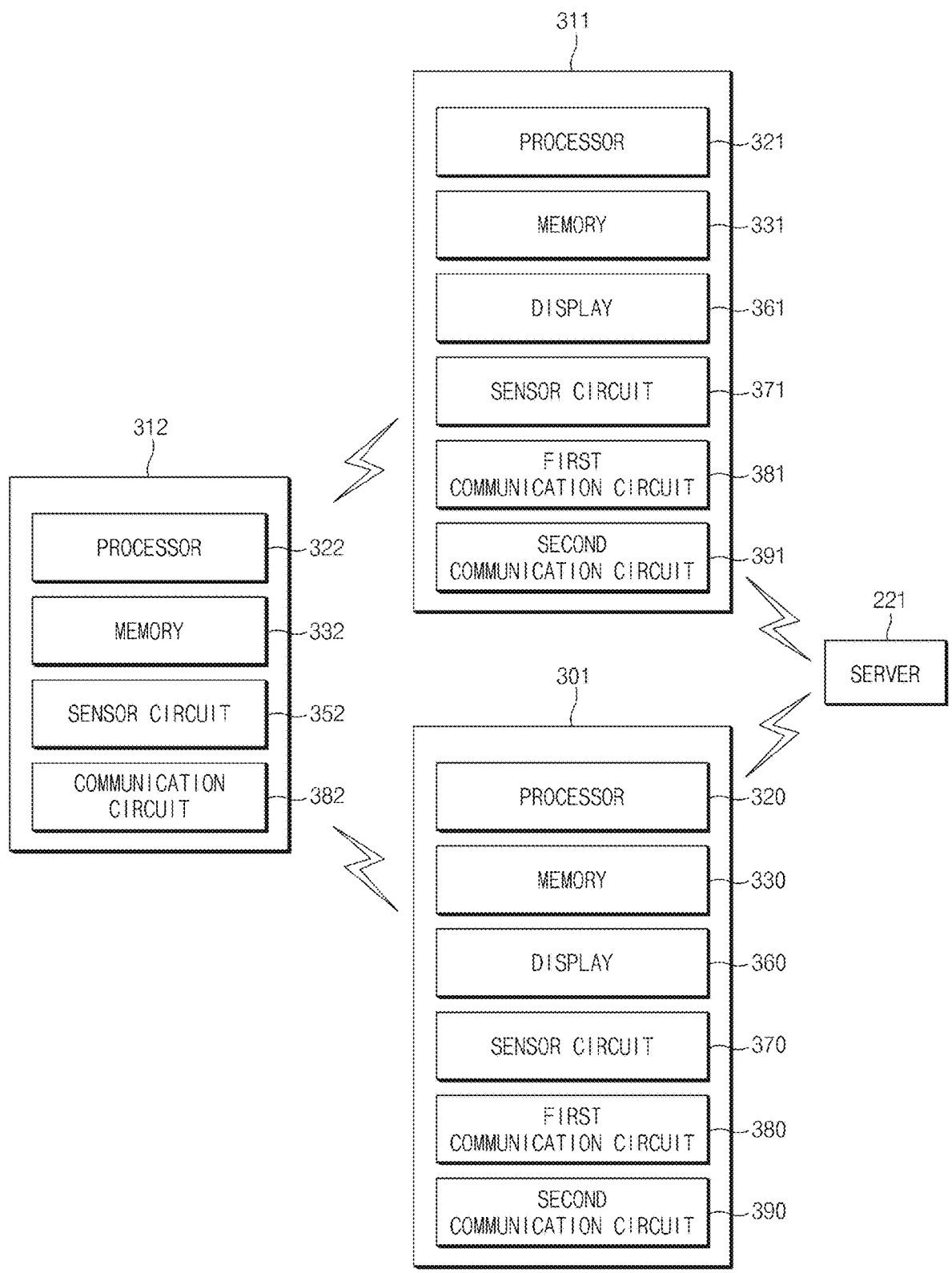
FIG. 3 illustrates a block diagram of electronic devices according to an embodiment.

FIG. 3 illustrates a block diagram of electronic devices according to an embodiment.

For example, an electronic device 301 (e.g., the second electronic device 212 or the third electronic device 213 of FIG. 2) may include a processor 320 (e.g., the processor 120 of FIG. 1), a display 360 (e.g., the display module 160 of FIG. 1), a memory 330 (e.g., the memory 130 of FIG. 1), a sensor circuit 370 (e.g., the sensor module 176 of FIG. 1), a first communication circuit 380 (e.g., the communication module 190 of FIG. 1), and a second communication circuit 390 (e.g., the communication module 190 of FIG. 1). The processor 320 may be operatively connected to the memory 330, the display 360, the sensor circuit 370, the first communication circuit 380, and the second communication circuit 390. The memory 330 may store one or more instructions that, when executed, cause the processor 320 to perform various operations of the electronic device 301. The sensor circuit 370 may include at least one module (e.g., a GPS module and/or a GNSS module) capable of positioning the electronic device 301. The first communication circuit 380 may support short-range wireless communication (e.g., Bluetooth (Bluetooth legacy and/or Bluetooth low energy (BLE)), neighbor awareness network (NAN), Wi-Fi Direct, and/or ultrawide band (UWB) communication). For example, the electronic device 301 may communicate with an external electronic device 312 using the first communication circuit 380. The second communication circuit 390 may support wireless communication (e.g., cellular communication or WLAN communication) for communication with the server 221. The configurations of the electronic device 301 illustrated in FIG. 3 are exemplary, and embodiments of the disclosure are not limited thereto. The electronic device 301 may further include a component not illustrated in FIG. 3 (e.g., at least one of the components of the electronic device 101 of FIG. 1). For example, the electronic device 301 may further include a battery and a housing. For another example, the electronic device 301 may further include a display (e.g., the display module 160 of FIG. 1) according to a device type.

According to an embodiment, a user device 311 (e.g., the first electronic device 211 of FIG. 2) may include a processor 321 (e.g., the processor 120 of FIG. 1), a memory 331 (e.g., the memory 130 of FIG. 1), a display 361 (e.g., the display module 160 of FIG. 1), a sensor circuit 371 (e.g., the sensor module 176 of FIG. 1), a first communication circuit 381 (e.g., the communication module 190 of FIG. 1), and a second communication circuit 391 (e.g., the communication module 190 of FIG. 1). The processor 321 may be operatively connected to the memory 331, the display 361, the sensor circuit 371, the first communication circuit 381, and the second communication circuit 391. The memory 331 may store one or more instructions that, when executed, cause the processor 321 to perform various operations of the user device 311. The sensor circuit 371 may include at least one module (e.g., a GPS module and/or a GNSS module) capable of positioning the user device 311. The first communication circuit 381 may support short-range wireless communication (e.g., Bluetooth (Bluetooth legacy and/or Bluetooth low energy (BLE)), neighbor awareness network (NAN), Wi-Fi Direct, and/or ultrawide band (UWB) communication). For example, the user device 311 may communicate with an external electronic device 312 using the first communication circuit 381. The second communication circuit 391 may support wireless communication (e.g., cellular communication or WLAN communication) for communication with the server 221. The configurations of the user device 311 illustrated in FIG. 3 are exemplary, and embodiments of the disclosure are not limited thereto. The user device 311 may further include a component not illustrated in FIG. 3 (e.g., at least one of the components of the electronic device 101 of FIG. 1).

According to an embodiment, the external electronic device 312 (the mobile transceiver 201 of FIG. 2) may include a processor 322 (e.g., the processor 120 of FIG. 1), a memory 332 (e.g., the memory 130 of FIG. 1), a sensor circuit 352 (e.g., the sensor module 176 of FIG. 1), and/or a communication circuit 382 (e.g., the communication module 190 of FIG. 1). The processor 322 may be operatively connected to the memory 332, the sensor circuit 352, and the communication circuit 382. The memory 332 may store one or more instructions that, when executed, cause the processor 322 to perform various operations of the external electronic device 312. The sensor circuit 352 may include at least one sensor (e.g., an acceleration sensor, an inertial sensor, and/or a gyro sensor) capable of detecting motion information of the external electronic device 312. The communication circuit 382 may be configured to support short-range wireless communication. For example, the communication circuit 380 may support Bluetooth (e.g., Bluetooth legacy and/or Bluetooth low energy (BLE)), neighbor awareness network (NAN), Wi-Fi Direct, and/or ultrawide band (UWB) communication. The configurations of the external electronic device 312 illustrated in FIG. 3 are exemplary, and embodiments of the disclosure are not limited thereto.

Hereinafter, operations of the electronic device 301, the user device 311, and the external electronic device 312 will be described by referring to the configurations of the electronic device 301, the user device 311, and the external electronic device 312 described above with reference to FIG. 3. For example, operations of the electronic device 301 may be referred to as being performed by the processor 320, operations of the user device 311 by the processor 321, and operations of the external electronic device 312 by the processor 322. As described above with reference to FIG. 2, the external electronic device 312 may be referred to as a device associated with the user device 311. For example, the user device 311 may be referred to as a companion device of the external electronic device 312. The electronic device 301 may be an electronic device positioned adjacent to the external electronic device 312. A user of the electronic device 301 and a user of the external electronic device 312 may be different from each other.

According to an embodiment, the electronic device 301 may receive at least one advertisement (ADV) packet from the external electronic device 312 using the first communication circuit 380, and determine whether to upload identification information of the external electronic device 312 based on at least one of information of a channel through which the at least one ADV packet is received or information of the external electronic device 312 included in the at least one ADV packet. The electronic device 301 may transmit the identification information of the external electronic device 312 and the location information of the electronic device 301 to an external server device (e.g., the server 221) using the second communication circuit 390, in response to the determination to upload the identification information. For example, the at least one ADV packet may include at least one of the identification information, congestion information, importance information, or battery information of the external electronic device 312 in ADV data.

For example, the electronic device 301 may transmit the identification information of the external electronic device 312 to the external server device if the number of reception channels of the at least one ADV packet is equal to or greater than a specified number and a reception strength of the at least one ADV packet is equal to or greater than a specified strength.

For example, information of the external electronic device 312 may include importance information of the external electronic device 312. The electronic device 301 may transmit the identification information of the external electronic device 312 to the external server device if the importance information indicates a high importance. The electronic device 301 may transmit the identification information of the external electronic device 312 to the external server device based on the information of the channel through which the at least one ADV packet is received, if the importance information indicates a low importance.

For example, the information of the external electronic device 312 may include congestion information. The electronic device 301 may transmit the identification information of the external electronic device to the external server device if the congestion information indicates a low congestion. The electronic device 301 may transmit the identification information of the external electronic device to the external server device based on the information of the channel through which the at least one ADV packet is received, if the congestion information indicates a high congestion.

For example, the information of the external electronic device 312 may include battery information. The electronic device 301 may transmit the identification information of the external electronic device to the external server device if the battery information indicates a low battery state. The electronic device 301 may transmit the identification information of the external electronic device to the external server device based on the information of the channel through which the at least one ADV packet is received, if the battery information indicates a high battery state.

The electronic device 301 may transmit the identification information of the external electronic device and the location information of the electronic device to the external server device when the at least one ADV packet is received once, if setting of the electronic device 301 indicates a high connection frequency. In addition, the electronic device 301 may determine whether to upload identification information of the external electronic device based on at least one of information of the channel through which the at least one ADV packet is received or information of the external electronic device included in the at least one ADV packet, if the setting of the electronic device 301 indicates a low connection frequency.

The electronic device 301 may acquire location information of the electronic device using the sensor circuit 370. The electronic device 301 may upload, to the server 221, the location information acquired using the sensor circuit 370.

The electronic device 301 may determine whether the congestion information, the importance information, or the battery information satisfies an exception condition. The electronic device 301 may transmit the identification information of the external electronic device and location information of the electronic device to the external server device when the at least one ADV packet is received, if the exception condition is satisfied. The electronic device 301 may determine whether to upload the identification information of the external electronic device based on the information of the reception channel of at least one ADV packet, if the exception condition is not satisfied. For example, the exception condition may be satisfied if the congestion information indicates low congestion, if the importance information indicates high importance, or if the battery information indicates a low battery state.

Figure 4:
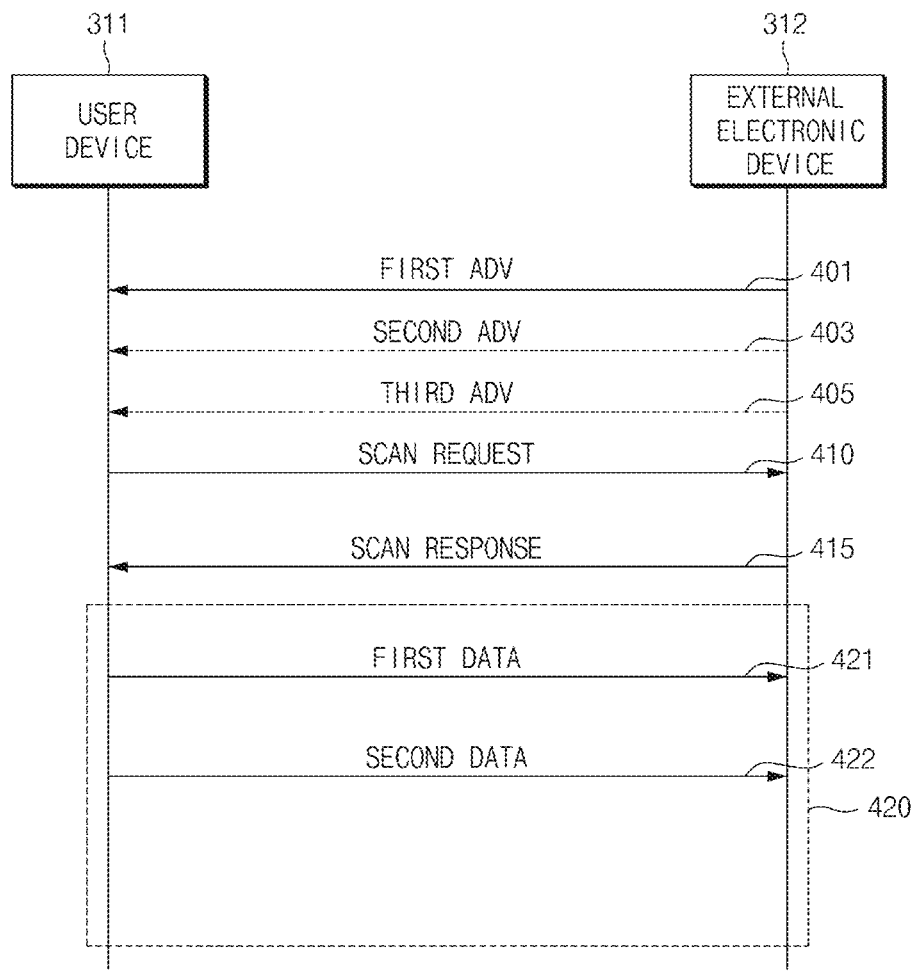
FIG. 4 illustrates a signal flow diagram for connection between a user device and an external electronic device, according to an embodiment.

FIG. 4 illustrates a signal flow diagram for connection between the user device 311 and the external electronic device 312, according to an embodiment.

Referring to FIGS. 3 and 4, according to an embodiment, the external electronic device 312 may communicate with the user device 311. For example, the external electronic device 312 may communicate with the user device 311 using the communication circuit 382. Hereinafter, for convenience of description, the external electronic device 312 may communicate with the user device 311 based on Bluetooth (e.g., Bluetooth legacy and/or BLE). A core specification of a Bluetooth special interest group (SIG) may be referred to in embodiments of the disclosure. In the embodiment shown, the external electronic device 312 are paired with the user device 311.

In operation 401, the external electronic device 312 may transmit a first advertising (ADV) packet. For example, the external electronic device 312 may transmit the first ADV packet through at least one of the ADV channels (e.g., channel 37 (center frequency of 2402 MHz), channel 38 (center frequency of 2426 MHz), and channel 39 (center frequency of 2480 MHz)). In operation 403, the external electronic device 312 may transmit a second ADV packet. In operation 405, the external electronic device 312 may transmit a third ADV packet. For example, the external electronic device 312 may transmit the second ADV packet after a specified time interval has elapsed after the transmission of the first ADV packet, and transmit the third ADV packet after a specified time interval has elapsed after the transmission of the second ADV packet. The first ADV packet and the second ADV packet may be transmitted through different ADV channels, the second ADV packet and the third ADV packet may be transmitted through different channels, and the third ADV packet and the second ADV packet may be transmitted through different channels. For example, the external electronic device 312 may include the address of the user device 311, a specified ADV handle value, and/or information on the battery charge state of the external electronic device 312 in the ADV packet. In FIG. 4, a plurality of ADV packets are transmitted, but embodiments of the disclosure are not limited thereto. The external electronic device 312 may transmit one ADV packet (for example, only one ADV packet). For example, operations 403 and 405 may be omitted. For another example, in operation 401, the external electronic device 312 may transmit one ADV (e.g., the first ADV) using one channel a plurality of times, and may perform operation 410 if the user device 311 receives one ADV (e.g., the first ADV).

In operation 410, the user device 311 may transmit a scan request to the external electronic device 312. In response to receiving the ADV packet from the external electronic device 312, the user device 311 may transmit the scan request to the external electronic device 312. The user device 311 may include the received ADV handle value in the scan request.

In operation 415, the external electronic device 312 may transmit a scan response to the user device 311 in response to receiving the scan request.

According to an embodiment, in operation 420, the user device 311 may establish a connection link (e.g., LE connection) with the external electronic device 312, and transmit and receive data through the connection link. For example, the user device 311 may generate a connection with the external electronic device 312 by transmitting the connection request to the external electronic device 312.

In operation 421, the user device 311 may transmit first data through the generated link. For example, the first data may include location information, time information, and/or congestion information of the user device 311. The external electronic device 312 may store the received location information, time information, and/or congestion information in a memory. In an example, the external electronic device 312 may store location information, time information, and/or congestion information in advance. The location information, time information, and/or congestion information may be information set by the manufacturer of the external electronic device 312 or the user device 311.

For example, the user device 311 may acquire information on a geographic location of the user device 311 using the sensor circuit 371, and may include the acquired geographic location information in the first data. Since the external electronic device 312 is located adjacent to the user device 311, the external electronic device 312 may store the location information of the user device 311 as the location information of the external electronic device 312. For example, the user device 311 may include information on a geographic location including latitude and longitude information in the location information.

For example, the time information may include current time information acquired by the user device 311. The time information may include information about a crowded time period set by the user device 311. For example, the crowded time period may be set as a commute time section (e.g., 7:00 am to 9:00 am and/or 5:00 pm to 8:00 pm). The information about the crowded time period may be set by the user of the user device 311 or may be set by the manufacturer of the user device 311. In an example, the user device 311 may acquire information about the crowded time period from the server 221. The server 221 may acquire a user distribution for the plurality of electronic devices for each hour by receiving location information from the plurality of electronic devices. The server 221 may determine the crowded time period based on the user distribution for each hour. In an example, the information about the crowded time period may be set based on history information of other electronic devices discovered by the user device 311. For example, the user device 311 may periodically perform scanning (e.g., Bluetooth, Wi-Fi, and/or Neighbor Aware Networking-based (NAAN-based) peripheral device discovery), and may set, as the crowded time period, the time period in which the number of peripheral electronic devices discovered through scanning is equal to or greater than a specified number.

For example, the congestion information may include a congestion detected by the user device 311. The user device 311 may perform scanning before transmitting the first data and discover peripheral electronic devices through the scanning. The user device 311 may set the congestion information to a high value when the number of discovered peripheral electronic devices is equal to or greater than a specified value. The user device 311 may set the congestion information to low congestion when the number of discovered peripheral electronic devices is less than the specified value.

In operation 422, the user device 311 may transmit second data through the generated link. The second data may include location information, time information, battery information, and/or congestion information of the user device 311. For example, the user device 311 may be configured to transmit the second data after a specified period has elapsed after the transmission of the first data. The user device 311 may be configured to transmit the second data when data is changed from the first data. For example, when time information is changed by more than a specified time interval, when location information is changed by more than a specified distance, when battery information is changed by more than a certain value, when the user device 311 enters a specified location (e.g., in a crowded area), or the congestion information is changed, the user device 311 may transmit the second data to the external electronic device 312.

Figure 5:
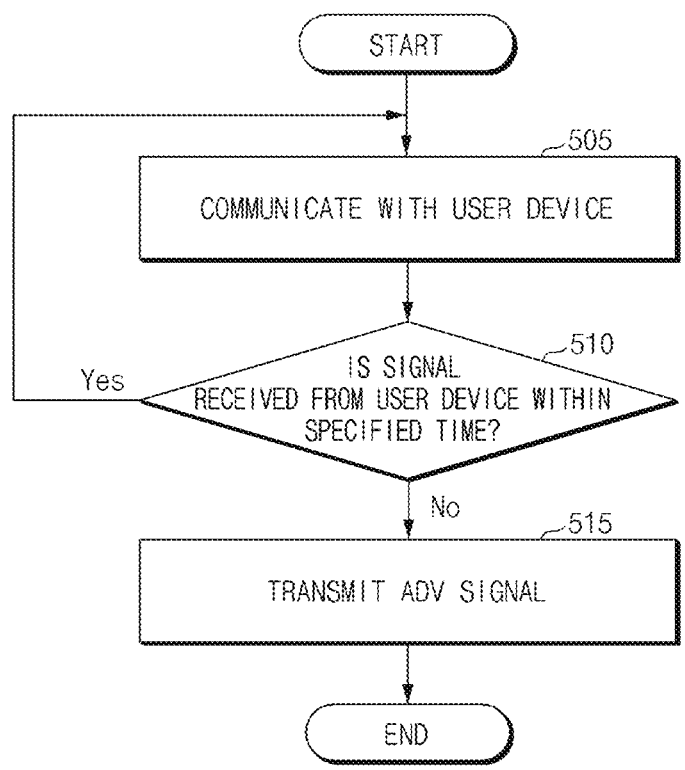
FIG. 5 illustrates a method for transmitting advertising signals by an external electronic device according to an embodiment.

FIG. 5 illustrates a method for transmitting advertising signals by the external electronic device 312 according to an embodiment.

In operation 505, the external electronic device 312 may communicate with the user device 311. The external electronic device 312 may be configured to periodically communicate with the user device 311. The external electronic device 312 may communicate with the user device 311 by receiving specified signals from the user device 311 (e.g., the scan request in operation 410 of FIG. 4, the first data in operation 421, and/or the second data in operation 422).

In operation 510, the external electronic device 312 may determine whether a signal is received from the user device 311 within a specified time. The external electronic device 312 may determine whether a signal is received from the user device 311 within a specified time (e.g., 5 seconds) from the latest signal reception time (e.g., the latest execution time of operation 505) from the user device 311. When a signal is received from the user device 311 within the specified time (e.g., Yes in operation 510, the external electronic device 312 may continuously communicate with the user device 311 periodically. For example, the external electronic device 312 may receive data (e.g., the first data or the second data of FIG. 4) from the user device 311 to update location information, time information, and/or congestion information.

When a signal is not received from the user device 311 within the specified time (e.g., No in operation 510, in operation 515, the external electronic device 312 may transmit an ADV signal. The external electronic device 312 may determine that the external electronic device 312 is disconnected from the user device 311 if a signal is not received from the user device 311 for a specified time or longer. The external electronic device 312 may transmit information of the external electronic device 312 to peripheral devices by transmitting the ADV signal. For example, the external electronic device 312 may include information (e.g., identifier and/or address information), location information, importance information, and/or battery information of the external electronic device 312 in the ADV signal. Information that may be included in the ADV signal will be described below with reference to FIG. 8. By transmitting information of the external electronic device 312 to the peripheral device, the external electronic device 312 may cause the peripheral devices to upload location information of the external electronic device 312 in a lost state to the server 221.

In relation to operation 510, it has been described that the external electronic device 312 transmits the ADV signal if the external electronic device 312 fails to receive a signal from the user device 311, but embodiments of the disclosure are not limited thereto. The external electronic device 312 may transmit the ADV signal based on disconnection from the user device 311 and information received from the user device 311. According to an embodiment, if the external electronic device 312 does not receive a signal within the specified time from the user device 311, the external electronic device 312 may determine whether the external electronic device 312 is in a lost state based on the information received from the user device 311. For example, if the location information received from the user device 311 corresponds to a specified location (e.g., a trusted location such as home, school, and/or workplace), the external electronic device 312 may determine that the external electronic device 312 is not in the lost state. The external electronic device 312 may be configured to perform operation 515 in the lost state.

According to an embodiment, the external electronic device 312 may generate the ADV signal based on the last received information from the user device 311 and/or the state of the external electronic device 312. For example, the external electronic device 312 may set location information based on congestion information last received from the user device 311. The external electronic device 312 may set importance information based on the setting stored in the memory of the external electronic device 312. For example, the importance may be received from the user device 311. The external electronic device 312 may change the importance based on the battery state of the external electronic device 312. When the charge amount of the battery is less than a specified amount, the external electronic device 312 may change the importance to a higher level. The external electronic device 312 may set battery information based on the charge amount of the battery of the external electronic device 312.

According to an embodiment, the external electronic device 312 may transmit the ADV signal based on the last received information from the user device 311 and/or the state of the external electronic device 312. The external electronic device 312 may transmit the ADV signal in different ways depending on the last received information from the user device 311 and/or the state of the external electronic device 312. For example, the external electronic device 312 may set a transmission channel, a transmit power, and/or a transmission period of the ADV signal based on the location information, time information, and/or congestion information received from the user device 311.

For example, if the congestion is high, there may be a high probability that the external electronic device 312 will be discovered by peripheral electronic devices. In this case, the external electronic device 312 may transmit the ADV signal with the transmit power being set to be a low transmit power. Due to the reducing of transmit power, the battery consumption of the external electronic device 312 may be reduced. For another example, if the congestion is low, the external electronic device 312 may increase the discovery probability of the external electronic device 312 with the transmit power of the ADV signal being set to be a high value.

For example, if the congestion is high congestion, the external electronic device 312 may transmit the ADV signal through one channel. In this case, the probability of discovering the external electronic device 312 by peripheral electronic devices may be reduced. Accordingly, the upload of duplicated information of the external electronic device 312 may be reduced. For another example, if the congestion is low, the external electronic device 312 may transmit the ADV signal through all channels (e.g., ADV channels 37, 38, and 39).

Figure 6:
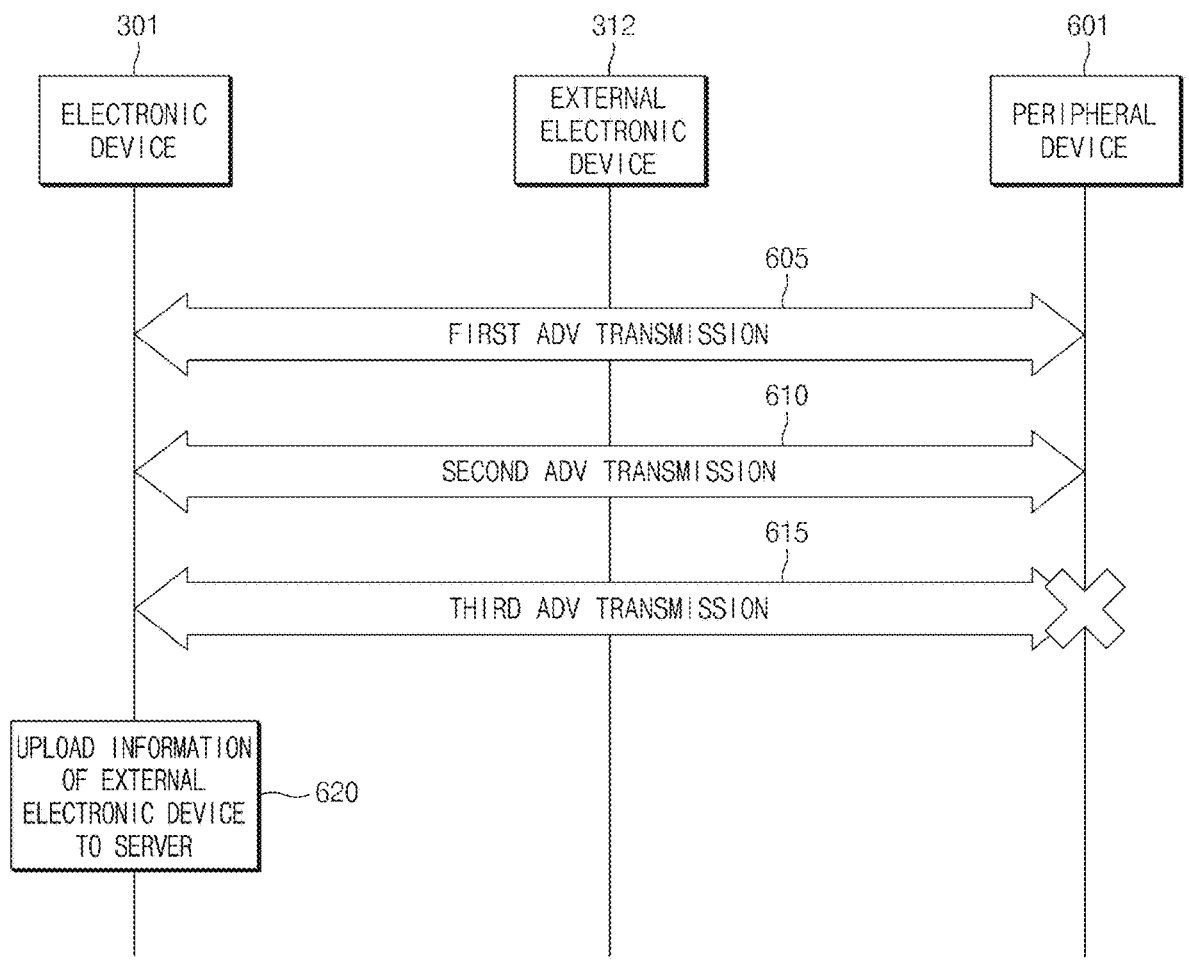
FIG. 6 illustrates a process of uploading information of an external electronic device by an electronic device according to an embodiment.

FIG. 6 illustrates a process of uploading information of an external electronic device by an electronic device according to an embodiment.

Referring to FIG. 6, in operation 605, the external electronic device 312 may transmit a first ADV. For example, the external electronic device 312 may transmit the first ADV based on disconnection (e.g., lost state) with the user device 311. For example, the external electronic device 312 may transmit the first ADV with a first power through the first channel.

In operation 610, the external electronic device 312 may transmit a second ADV. The external electronic device 312 may transmit the second ADV with a second power through the second channel. In operation 615, the external electronic device 312 may transmit a third ADV. The external electronic device 312 may transmit the third ADV with a third power through the third channel.

In the example of FIG. 6, each of the first ADV, the second ADV, and the third ADV may include information of the external electronic device 312. The first ADV, the second ADV, and the third ADV may be set to have different coverages. For example, the transmit power of the second ADV may be lower than the transmit power of the first ADV, and the transmit power of the third ADV may be lower than the transmit power of the second ADV. For example, the center frequency of the first channel may be lower than the center frequency of the second channel, and the center frequency of the second channel may be lower than the center frequency of the third channel.

Due to the difference in coverage, the electronic device 301 may receive all ADVs, but the peripheral device 601 may not receive the third ADV. According to an embodiment, the electronic device 301 and the peripheral device 601 may determine whether to upload information of the external electronic device 312 based on the number of times the ADV has been received. In the example of FIG. 6, the peripheral device 601 may receive the ADV twice (for example, only twice). The peripheral device 601 may not upload information of the external electronic device 312 to the server 221. The electronic device 301 may receive the ADV three times, and in operation 620, may upload information of the external electronic device 312 to the server 221.

Although it has been described in FIG. 6 that the electronic device 301 uploads information of the external electronic device 312 based on the number of times the ADV has been received, embodiments of the disclosure are not limited thereto. As will be described below with reference to FIGS. 7 to 12, the electronic device 301 may determine whether to upload information of the external electronic device 312 based on the setting of the electronic device, the number of times the ADV has been received, and/or information included in the ADV.

In the example of FIG. 6, the external electronic device 312 is shown to transmit the ADV signal three times, but embodiments of the disclosure are not limited thereto. The external electronic device 312 may transmit the ADV signal one or more times. For example, if a response signal to the ADV signal is received from the electronic device 310 and/or the peripheral device 601, the external electronic device 312 may not transmit an additional ADV signal.

Figure 7:
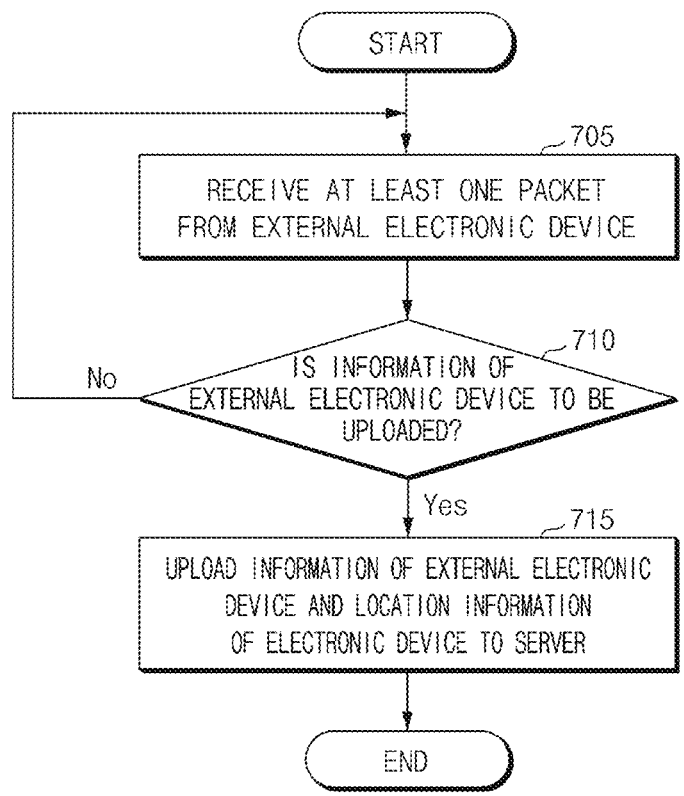
FIG. 7 illustrates a method of uploading information of an external electronic device by an electronic device according to an embodiment.

FIG. 7 illustrates a method of uploading information of an external electronic device by an electronic device according to an embodiment.

In operation 705, the electronic device 301 may receive at least one packet from the external electronic device 312. For example, the electronic device 301 may receive at least one ADV packet (e.g., operations 605, 610, and/or 615 of FIG. 6) from the external electronic device 312.

In operation 710, the electronic device 301 may determine whether to upload information of the external electronic device 312. For example, the electronic device 301 may perform operation 710 in a specified period. The electronic device 301 may dynamically set the specified period based on the current time, the current location, and/or the setting of the electronic device 301. The electronic device 301 may set the specified period to increase in the location and/or time period of a high congestion.

According to an embodiment, the electronic device 301 may determine whether to perform uploading based on the reception channel of the ADV packet, a reception strength of the ADV packet, the number of times the ADV packet has been received, ADV packet information, information of the electronic device 301, and/or the setting of the electronic device 301.

For example, the electronic device 301 may determine whether to perform uploading based on setting information of the electronic device 301. The electronic device 301 may determine whether to perform uploading based on upload frequency setting. The upload frequency may be set by the user of the electronic device 301 or may be adjusted based on the battery state of the electronic device 301. If the upload frequency is set to a high upload frequency value, the electronic device 301 may upload information of the external electronic device 312 to the server 221 when receiving the ADV packet once. If the upload frequency is set to a low upload frequency value, the electronic device 301 may upload the information of the external electronic device 312 to the server 221 when receiving the ADV packet a specified number of times (e.g., three times) or more. In an example, the upload frequency of the electronic device 301 may be changed based on the surrounding congestion of the electronic device 301. The electronic device 301 may set the upload frequency to the low upload frequency value if the surrounding congestion is high, and may set the upload frequency to the high upload frequency value if the surrounding congestion is low. By uploading information of the external electronic device 312 based on the setting information of the electronic device 301, the electronic device 301 may perform uploading in accordance with the intention of the user.

For example, the electronic device 301 may determine whether to perform uploading based on the reception strength of the ADV packet. The electronic device 301 may upload the information of the external electronic device 312 to the server 221 when the reception strength of the ADV packet is equal to or greater than a specified strength. The electronic device 301 may check the reception strength of the ADV packet using a received signal strength indicator (RSSI) associated with the ADV packet. By uploading the information of the external electronic device 312 when the reception strength of the ADV packet is high, the electronic device 301 may reduce the number of uploads.

For example, the electronic device 301 may determine whether to perform uploading based on the number of times the ADV packet has been received. The electronic device 301 may be configured to upload the information of the external electronic device 312 to the server 221 when the ADV packet is received more than a specified number of times. For example, by uploading information when the ADV packet is received a specified number of times, the electronic device 301 may reduce the upload frequency.

For example, the electronic device 301 may determine whether to perform uploading based on the ADV packet information. When the congestion included in the ADV packet indicates low congestion, the electronic device 301 may upload information of the external electronic device 312 to the server 221. If the ADV packet includes information indicating that the importance of the external electronic device 312 is high, the electronic device 301 may upload the information of the external electronic device 312. If the ADV packet includes information indicating that the battery state of the external electronic device 312 is low, the electronic device 301 may upload the information of the external electronic device 312. The electronic device 301 may determine whether to upload by aggregating the ADV packet information. The electronic device 301 may upload information of the external electronic device 312 when at least one of the importance, location, or battery state of the external electronic device satisfies an upload condition (e.g., low battery state, low congestion, or high importance). By uploading the information of the external electronic device 312 based on the ADV packet information, the electronic device 301 may perform uploading in consideration of a situation of the external electronic device 312.

For example, the electronic device 301 may determine whether to perform uploading based on information of the electronic device 301. The electronic device 301 may determine whether to perform uploading based on the geographic location of the electronic device 301. The electronic device 301 may receive information on the crowded area from the server 221, and if the electronic device 301 is in the crowded area, may upload the information of the external electronic device 312 to the server 221, even if one ADV packet is received. The electronic device 301 may perform scanning (e.g., Bluetooth, Wi-Fi, and/or NAAN-based peripheral device discovery), and if the number of peripheral electronic devices discovered through scanning is equal to or greater than a specified number, may upload the information of the external electronic device 312 to the server 221, even if one ADV packet is received.

For example, the electronic device 301 may determine whether to perform uploading based on the reception channel of the ADV packet. If the ADV packet is received through a plurality of channels, the electronic device 301 may upload information of the external electronic device 312. If the ADV packet is received through a plurality of channels among ADV channels 37, 38, and/or 39, the electronic device 301 may upload information of the external electronic device 312. By uploading information of the external electronic device 312 based on the reception channel of the ADV packet, the electronic device 301 may reduce the upload frequency.

The electronic device 301 may perform the above-described methods for determining the upload in combination with each other. For example, if the reception strength is equal to or greater than a specified strength and the upload frequency of the electronic device 301 is set to high, the electronic device 301 may upload information of the external electronic device 312 even if one ADV packet is received. For example, the electronic device 301 may upload the information of the external electronic device 312 based on the number of times an ADV packet having a reception strength equal to or greater than a specified strength is received or the number of reception channels of the ADV packet. For example, if the reception strength of the ADV packet is equal to or greater than a specified strength, the electronic device 301 may upload the information of the external electronic device 312 based on the ADV packet information.

If the information of the external electronic device 312 is not uploaded (e.g., No in operation 710), the electronic device 301 may continuously monitor whether a packet is received from the external electronic device 312. If the information of the external electronic device 312 is uploaded (e.g., Yes in operation 710), in operation 715, the electronic device 301 may upload the information of the external electronic device 312 (e.g., the identification information of the external electronic device 312) and location information of the electronic device 301 to the server 221. By uploading the information of the external electronic device 312 to the server 221, the electronic device 301 may transmit the location information of the external electronic device 312 to the user device 311 associated with the external electronic device 312 through the server 221.

For example, after the information of the external electronic device 312 is uploaded, the electronic device 301 may transmit, to the external electronic device 312, information indicating that the upload is completed. By notifying the external electronic device 312 that information has been uploaded, the external electronic device 312 may be caused to stop transmitting the ADV packet. After uploading the information of the external electronic device 312, the electronic device 301 may delete the information of the external electronic device 312.

Figure 8:
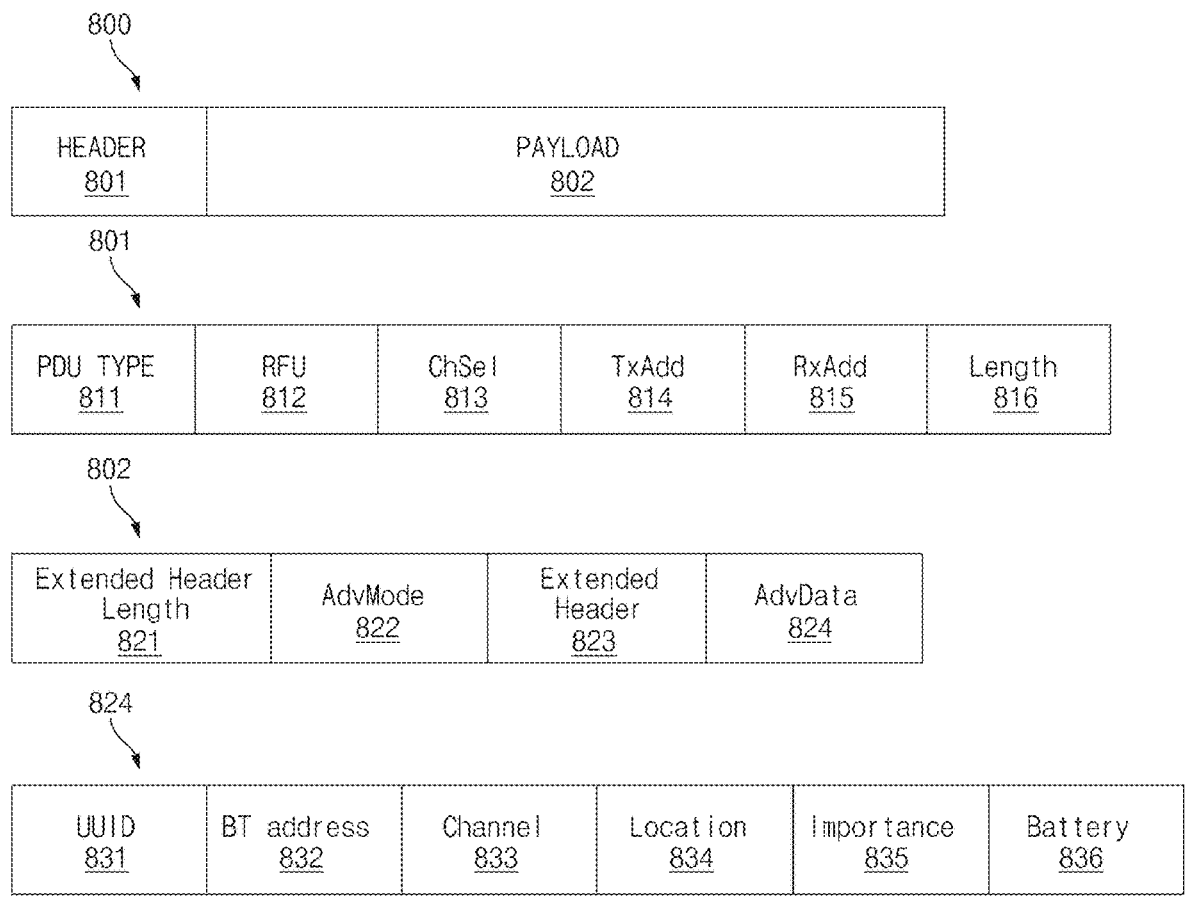
FIG. 8 illustrates a structure of an advertising packet according to an embodiment.

FIG. 8 illustrates a structure of the ADV packet according to an embodiment.

According to an embodiment, the external electronic device 312 may be configured to transmit an ADV packet in a lost state (e.g., operations 605, 610, and 615 of FIG. 6). For example, the external electronic device 312 may transmit an ADV packet 800 illustrated in FIG. 8. The ADV packet 800 may include a header 801 and a payload 802. The header 801 may have a length of 16 bits, and the payload 802 may have a length of 1 to 255 bytes.

The header 801 may include protocol data unit (PDU) type 811, reserved for future use (RFU) 812, Channel Selection (ChSel) 813, TxAdd 814, RxAdd 815, and Length 816 fields. The PDU type 811 has a length of 4 bits and may indicate the PDU type of the corresponding ADV packet 800. For example, in the case of ADV_IND type, PDU type 811 may have a value of 0b0000, and in case of ADV_EXT_IND or AUX_ADV_IND, PDU type 811 may have a value of 0b0111. The ChSel 813, TxAdd 814, and RxAdd 815 fields may have values specified in the PDU type. The Length 816 field may indicate the number of bytes of the payload 802.

The structure of the payload 802 illustrated in FIG. 8 is an example of a common extended advertising payload format. An Extended Header Length 821 field has a length of 6 bits and may indicate the length of an Extended Header 823 field. An AdvMode 822 field has a length of 2 bits and may indicate an advertising mode. The Extended Header 823 field has a length of 0 to 63 bytes and may include fields according to the Bluetooth SIG core standard. At least some of the fields to be described later with reference to FIG. 6 may be included. An AdvData 824 field may have a length of 0 to 254 bytes. The external electronic device 312 may include information of the external electronic device 312 in the AdvData 824 field.

According to an embodiment, the AdvData 824 field may include a universally unique identifier UUID 831, Bluetooth (BT) address 832, Channel 833, Location 834, Importance 835, and Battery 836 fields. The UUID 831 field may include identification information of the external electronic device 312 and may have a length of 16 bytes. The BT address 832 field may include Bluetooth address information of the external electronic device 312 and may have a length of 6 bytes. The Channel 833 field includes information on a transmission channel of the ADV packet 800 and may have a length of 1 byte. The Location 834 field may include information on the location of the external electronic device 312. For example, the Location 834 field may include information indicating whether the external electronic device 312 is in a crowded location. The Location 834 field may include a 1-bit flag indicating whether the external electronic device 312 is in a crowded location. The Location 834 field may have a length of 1 bit or 1 byte. The importance 835 field may include information indicating the importance of the external electronic device 312. The importance 835 field may include a 1-bit flag indicating the importance of the external electronic device 312. The importance 835 field may have a length of 1 bit or 1 byte. The Battery 836 field may include information indicating the battery state of the external electronic device 312. For example, the Battery 836 field may include a 1-bit flag indicating the battery charge amount of the external electronic device 312. The Battery 836 field may have a length of 1 bit or 1 byte. Although not illustrated, the AdvData 824 field may include WI-FI AP information, BT device information, network information, and/or GPS position information connected from the user device 311, and may also include a Reserved field for future expansion.

Figure 9:
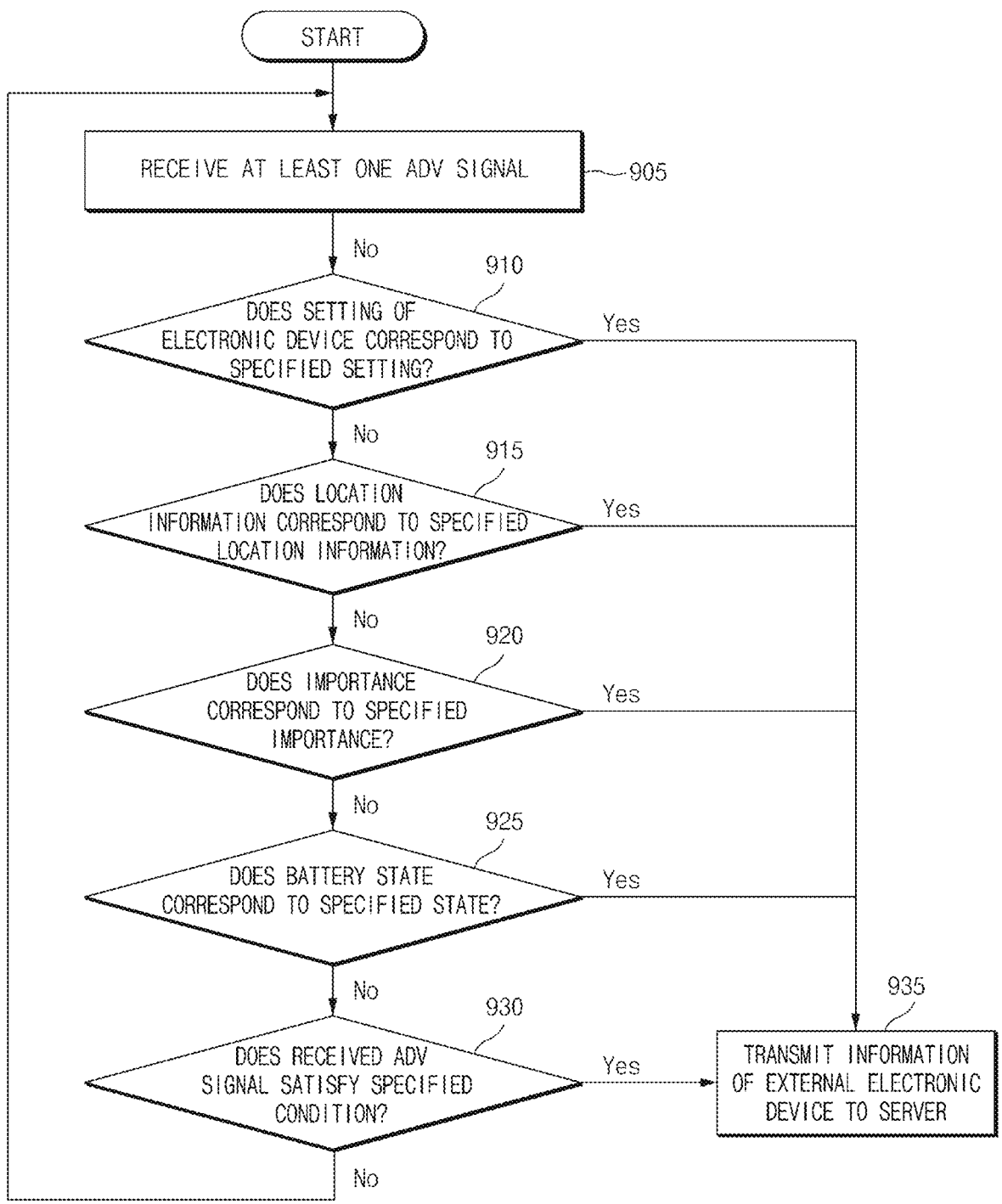
FIG. 9 illustrates a method of uploading information of an external electronic device by an electronic device according to an embodiment.

FIG. 9 illustrates a method of uploading information of an external electronic device by an electronic device according to an embodiment.

In operation 905, the electronic device 301 may receive at least one ADV signal from the external electronic device 312 (e.g., operation 705 of FIG. 7). For example, the at least one ADV signal may be an ADV signal having a reception strength equal to or greater than a specified reception strength. The external electronic device 312 may broadcast the ADV signal in a lost state. The electronic device 301 may be located adjacent to the external electronic device 312 to receive at least one ADV signal.

In operation 910, the electronic device 301 may determine whether the setting of the electronic device 301 corresponds to a specified setting. For example, if the upload frequency of the electronic device 301 is set to high, the electronic device 301 may determine that the setting corresponds to the specified setting. In this case (e.g., Yes in operation 910), in operation 935 (e.g., operation 715 of FIG. 7), the electronic device 301 may transmit, to the server 221, location information of the electronic device 301 and information (e.g., the identifier (e.g., the UUID 831 of FIG. 8) of the external electronic device 312) and/or address (e.g., the BT address 832 of FIG. 8) of the external electronic device 312.

If the upload frequency of the electronic device 301 is set to the low upload frequency value, the electronic device 301 may determine that the setting does not correspond to the specified setting. In this case (e.g., No in operation 910), in operation 915, the electronic device 301 may determine whether the location information of the ADV signal corresponds to specified location information. For example, the electronic device 301 may identify whether location information (e.g., the Location 834 of FIG. 8) of the ADV signal indicates a crowded state. If the location information of the ADV signal indicates not-crowded, the electronic device 301 may determine that the location information corresponds to the specified location information. In this case (e.g., Yes in operation 915), in operation 935, the electronic device 301 may transmit information of the external electronic device 312 to the server 221.

If the location information indicates crowded, the electronic device 301 may determine that the location information does not correspond to the specified location information. In this case (e.g., No in operation 915), in operation 920, the electronic device 301 may determine whether the importance of the external electronic device 312 included in the ADV signal corresponds to a specified importance (e.g., high). For example, the electronic device 301 may identify whether importance information (e.g., importance 835 of FIG. 8) of the ADV signal indicates high. If the importance information of the ADV signal indicates high, the electronic device 301 may determine that the importance information corresponds to the specified importance. In this case (e.g., Yes in operation 920), in operation 935, the electronic device 301 may transmit information of the external electronic device 312 to the server 221.

When the importance information indicates a low importance, the electronic device 301 may determine that the importance information does not correspond to the specified importance. In this case (e.g., No in operation 920), in operation 925, the electronic device 301 may determine whether the battery state of the external electronic device 312 included in the ADV signal corresponds to a specified state (e.g., low battery state). For example, the electronic device 301 may identify whether battery information (e.g., the Battery 836 field of FIG. 8) of the ADV signal indicates a low battery state. If the battery information of the ADV signal indicates the low battery state, the electronic device 301 may determine that the battery state corresponds to the specified state. In this case (e.g., Yes in operation 925), in operation 935, the electronic device 301 may transmit information of the external electronic device 312 to the server 221.

If the battery information indicates high, the electronic device 301 may determine that the battery information does not correspond to the specified state. In this case (e.g., No in operation 925), in operation 930, the electronic device 301 may determine whether the ADV signal satisfies a specified condition. For example, if the ADV signal is received through three ADV channels, the electronic device 301 may determine that the ADV signal satisfies the specified condition. If the ADV signal is received more than a specified number of times, the electronic device 301 may determine that the ADV signal satisfies the specified condition. If the reception strength of the ADV signal is equal to or greater than the specified strength and the ADV signal is received through three ADV channels or received more than the specified number of times, the electronic device 301 may determine that the ADV signal satisfies the specified condition. If the ADV signal does not satisfy the specified condition (e.g., No in operation 930), the electronic device 301 may continuously monitor the ADV signal. If the ADV signal satisfies the specified condition (e.g., Yes in operation 930), in operation 935, the electronic device 301 may transmit information of the external electronic device 312 to the server 221.

It has been described that upload conditions of various electronic devices 301 are serially processed with reference to FIG. 9, but embodiments of the disclosure are not limited thereto. At least some of the upload conditions may be parallel conditions. For example, in principle, the electronic device 301 may upload information of the external electronic device 312 based on a specified condition (e.g., operation 930). The remaining upload conditions (e.g., operations 910, 915, 920, or 925) may be exception conditions. For another example, in operation 905, the electronic device 301 may first check the strength of the received signal. If the strength of the received signal is equal to or greater than a specified strength, the electronic device 301 may determine whether to perform uploading based on the setting of the electronic device 301 (e.g., operation 910). When the setting of the electronic device 301 is not a specified setting, the electronic device 301 may check the content of the ADV signal. Based on the content of the ADV signal, the electronic device 301 may check whether the state of the external electronic device 312 satisfies an exception condition (e.g., location information, importance, or battery state). The electronic device 301 may be configured to determine whether the received ADV signal satisfies a specified condition (e.g., a specified number of channels and/or a specified number of receptions) (e.g., operation 930), if none of the exception conditions is satisfied.

Figure 10:
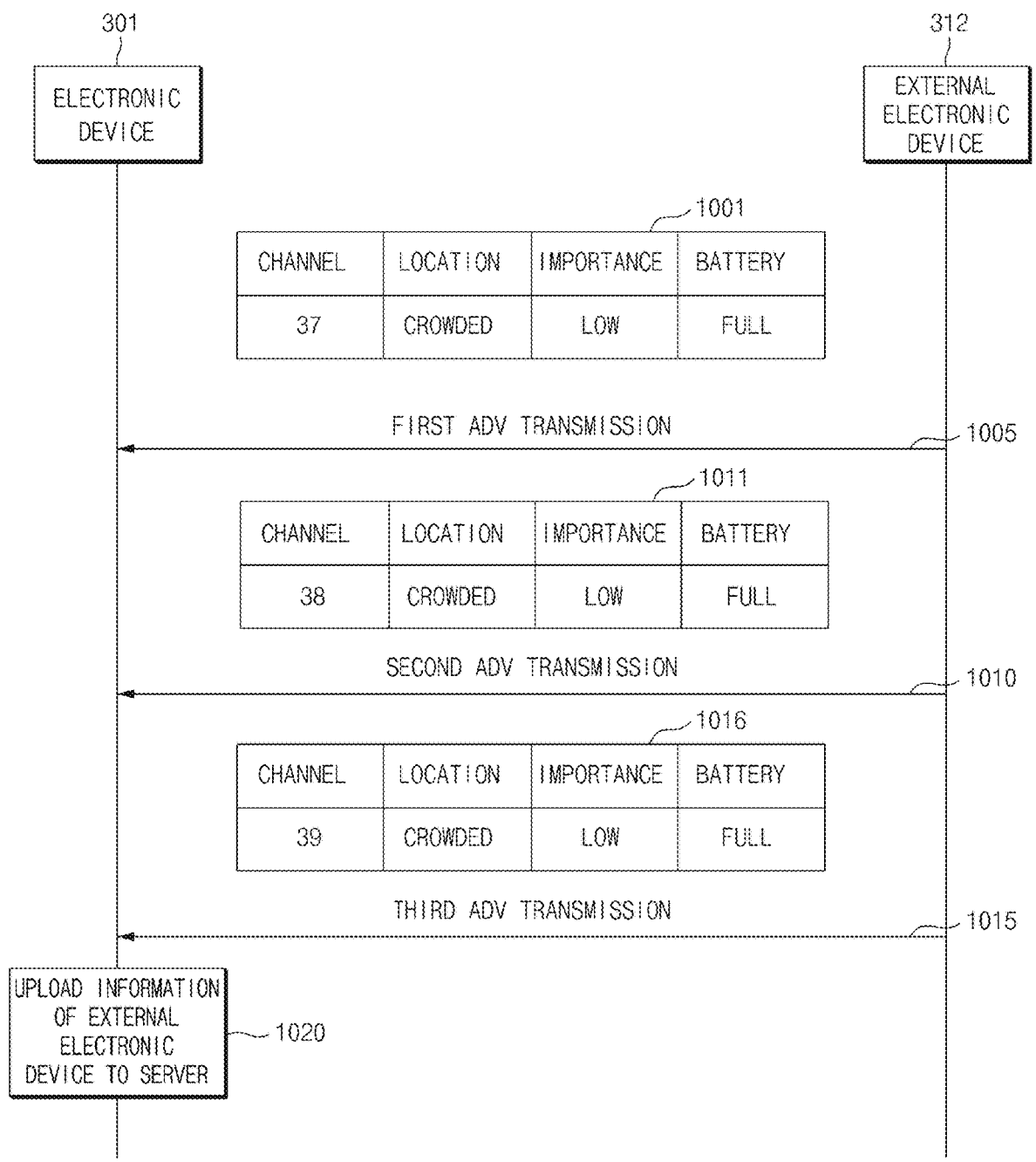
FIG. 10 illustrates an example of an operation of uploading information of an external electronic device by an electronic device.

FIG. 10 illustrates an example of an operation of uploading information of an external electronic device by an electronic device.

In the example of FIG. 10, the external electronic device 312 is in a lost state. The external electronic device 312 may notify peripheral electronic devices of the loss state by transmitting the ADV including information of the external electronic device 312 (i.e., its own information).

In operation 1005, the external electronic device 312 may transmit a first ADV For example, the first ADV may include first ADV data 1001. For example, information bits of the first ADV data 1001 may correspond to Channel 833, Location 834, Importance 835, and Battery 836 of FIG. 8, respectively. The channel of the first ADV data 1001 may indicate channel 37, the location may indicate crowded, the importance may indicate low importance, and the battery may indicate a high battery state (e.g., fully charge battery). The electronic device 301 that has received the first ADV may not upload the information of the external electronic device 312 to the server 221, since the content of the first ADV data 1001 does not satisfy the exception condition and only one ADV has been received from the external electronic device 312 through one channel. The electronic device 312 may store the received first ADV data 1001 in the memory.

In operation 1010, the external electronic device 312 may transmit a second ADV. In certain embodiments, second ADV data 1011 included in the second ADV may be different from the first ADV data 1001 only in channel information. The electronic device 301 may not upload the information of the external electronic device 312 to the server 221, since the content of the second ADV data 1011 does not satisfy the exception condition and the ADV has been received twice (for example, only twice) from the external electronic device 312 through two channels. The electronic device 312 may store the received second ADV data 1011 in the memory.

In operation 1015, the external electronic device 312 may transmit a third ADV In certain embodiments, the third ADV data 1016 included in the third ADV may be different from the first ADV data 1001 only in channel information. In operation 1020, the electronic device 301 may upload information of the external electronic device 312 to the server 221, since the electronic device 301 has received the ADV three times through three channels. The electronic device 301 may be configured to store the received ADV data in the memory for a specified period. The electronic device 301 may determine whether the received ADV data satisfies a specified condition (e.g., operation 930 of FIG. 9) by comparing the received ADV data.

Figure 11:
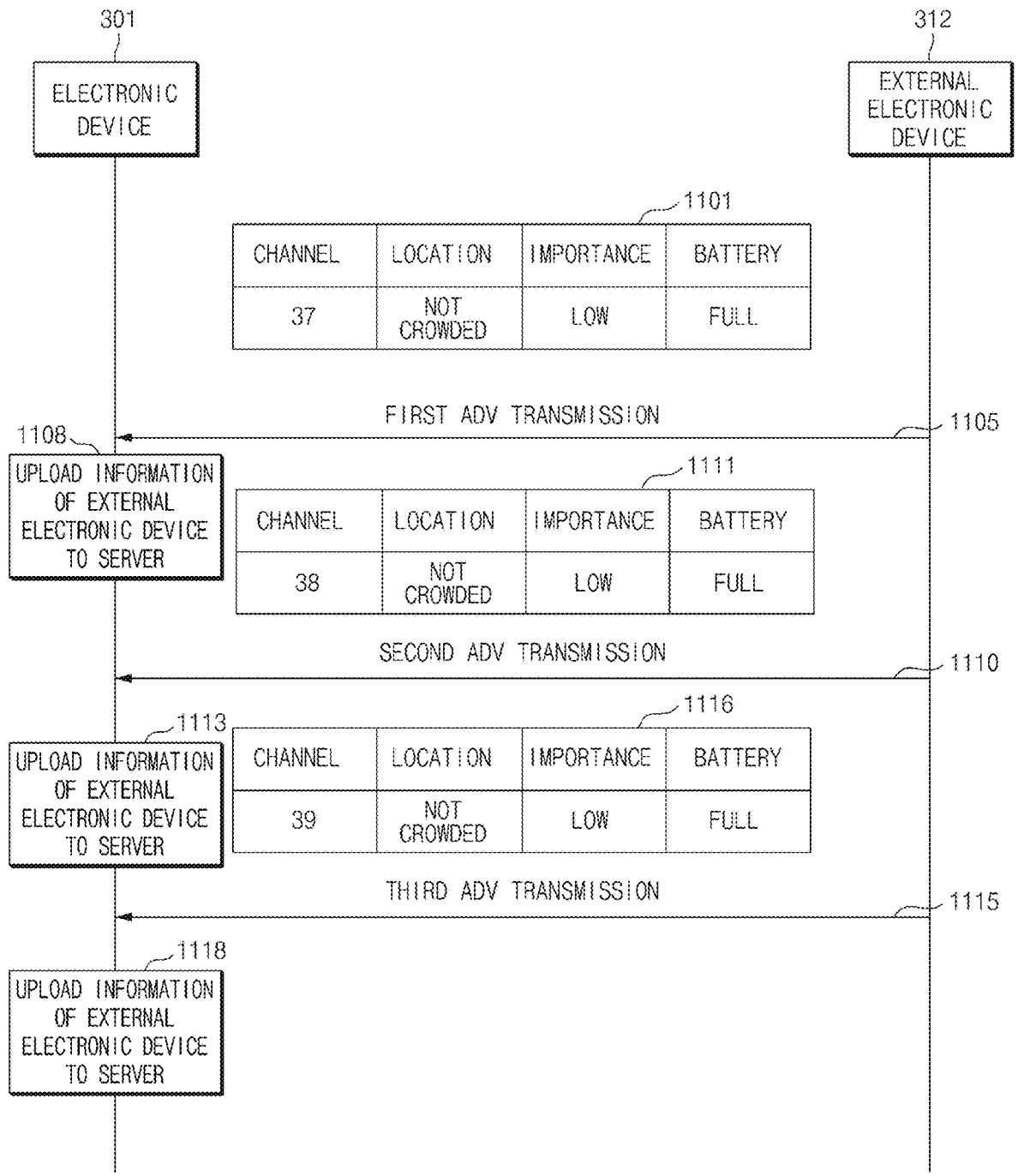
FIG. 11 illustrates another example of an operation of uploading information of an external electronic device by an electronic device.

FIG. 11 illustrates another example of an operation of uploading information of an external electronic device by an electronic device.

In the example of FIG. 11, the external electronic device 312 is in a lost state. The external electronic device 312 may notify peripheral electronic devices of the loss state by transmitting the ADV including information of the external electronic device 312 (i.e., its own information).

In operation 1105, the external electronic device 312 may transmit a first ADV. For example, the first ADV may include first ADV data 1101. For example, information bits of the first ADV data 1101 may correspond to Channel 833, Location 834, Importance 835, and Battery 836 of FIG. 8, respectively. The channel of the first ADV data 1101 may indicate channel 37, the location may indicate not-crowded, the importance may indicate low importance, and the battery may indicate the high battery state (e.g., fully charged battery). In operation 1108, the electronic device 301 that has received the first ADV may upload the information of the external electronic device 312 to the server 221, since the content of the first ADV data 1101 satisfies an exception condition (e.g., not crowded). For example, the electronic device 301 may upload information of the external electronic device 312 and location information the electronic device 301 together.

In operation 1110, the external electronic device 312 may transmit a second ADV. In certain embodiments, second ADV data 1111 included in the second ADV may be different from the first ADV data 1001 only in channel information. In operation 1113, the electronic device 301 may upload the information of the external electronic device 312 to the server 221, since the content of the second ADV data 1111 satisfies the exception condition.

In operation 1115, the external electronic device 312 may transmit a third ADV In certain embodiments, third ADV data 1116 included in the third ADV may be different from the first ADV data 1001 only in channel information. In operation 1118, the electronic device 301 may upload the information of the external electronic device 312 to the server 221, since the content of the third ADV data 1116 satisfies the exception condition.

Figure 12:
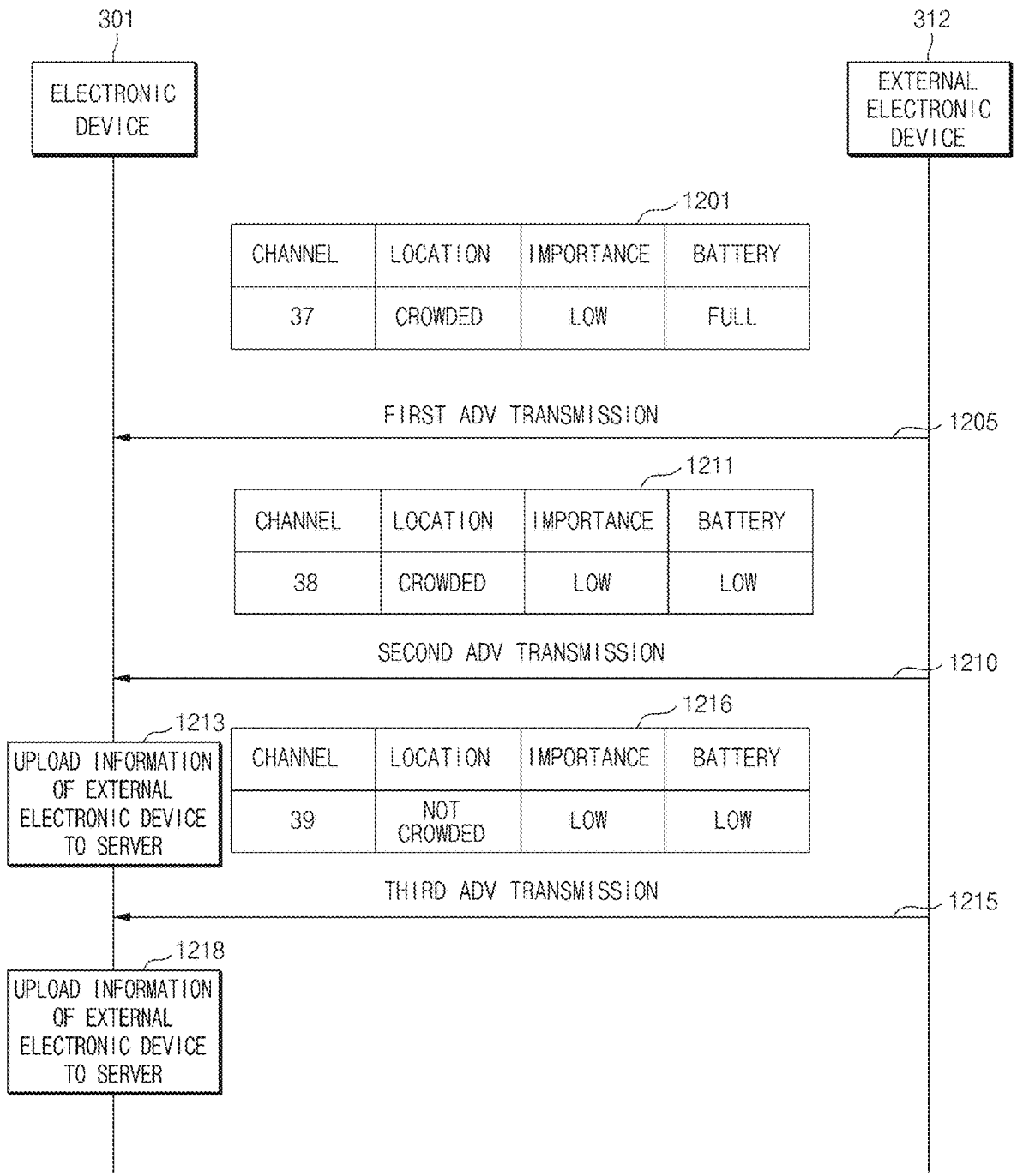
FIG. 12 illustrates yet another example of an operation of uploading information of an external electronic device by an electronic device.

FIG. 12 illustrates yet another example of an operation of uploading information of an external electronic device by an electronic device.

In the example of FIG. 12, the external electronic device 312 is in a lost state. The external electronic device 312 may notify peripheral electronic devices of the loss state by transmitting the ADV including information of the external electronic device 312 (i.e., its own information).

In operation 1205, the external electronic device 312 may transmit the first ADV. For example, the first ADV may include first ADV data 1201. For example, information bits of the first ADV data 1201 may correspond to Channel 833, Location 834, Importance 835, and Battery 836 of FIG. 8, respectively. The channel of the first ADV data 1001 may indicate channel 37, the location may indicate crowded, the importance may indicate low importance, and the battery may indicate a high battery state. The electronic device 301 that has received the first ADV may not upload the information of the external electronic device 312 to the server 221, since the content of the first ADV data 1101 does not satisfy the exception condition and only one ADV has been received from the external electronic device 312 through one channel.

In operation 1210, the external electronic device 312 may transmit the second ADV. After the first ADV is transmitted, the charge amount in the battery of the external electronic device 312 may be reduced. As the charge amount of the battery is reduced to less than a specified amount, the external electronic device 312 may set the battery information of the second ADV data 1211 to the low battery state. In operation 1213, the electronic device 301 may upload the information of the external electronic device 312 to the server 221, since the content of the second ADV data 1111 satisfies the exception condition (e.g., the battery state is low).

In operation 1215, the external electronic device 312 may transmit the third ADV. In third ADV data 1216 included in the third ADV, location information may be set to not-crowded and battery information may be set to the low battery state. In operation 1218, the electronic device 301 may upload the information of the external electronic device 312 to the server 221, since the content of the third ADV data 1216 satisfies the exception condition (e.g., location information indicates no crowdedness and battery information indicates low battery state).

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a first wireless communication circuit configured to perform short-range wireless communication;
a second wireless communication circuit;
a processor; and
a memory,
wherein the memory stores instructions that, when executed by the processor, cause the electronic device to:
receive at least one advertisement (ADV) packet from an external electronic device using the first wireless communication circuit;
determine whether to upload identification information of the external electronic device based on information of a channel through which the at least one ADV packet is received; and
transmit the identification information of the external electronic device and location information of the electronic device to an external server device using the second wireless communication circuit, in response to a determination to upload the identification information,
wherein, when executed, the instructions further cause the electronic device to transmit the identification information of the external electronic device to the external server device in response to determining a number of channels through which the at least one ADV packet is received is equal to or greater than a specified number.

2. The electronic device of claim 1, wherein when executed, the instructions cause the electronic device to identify the number of channels through which the at least one ADV packet is received from a number of channels with a reception strength of the at least one ADV packet is equal to or greater than a specified strength.

3. The electronic device of claim 1, wherein the at least one ADV packet comprises information of the external electronic device including importance information of the external electronic device, and
wherein, when executed, the instructions cause the electronic device to:
transmit the identification information of the external electronic device to the external server device in response to determining the importance information indicates a high importance; and
transmit the identification information of the external electronic device to the external server device based on the information of the channel through which the at least one ADV packet is received, in response to determining the importance information indicates a low importance.

4. The electronic device of claim 1, wherein the at least one ADV packet comprises information of the external electronic device including congestion information, and
wherein, when executed, the instructions cause the electronic device to:
transmit the identification information of the external electronic device to the external server device in response to determining the congestion information indicates a low congestion; and
transmit the identification information of the external electronic device to the external server device based on the information of the channel through which the at least one ADV packet is received, in response to determining the congestion information indicates a high congestion.

5. The electronic device of claim 1, wherein the at least one ADV packet comprises information of the external electronic device including battery information, and
wherein, when executed, the instructions cause the electronic device to:
transmit the identification information of the external electronic device to the external server device in response to determining the battery information indicates a low battery state; and
transmit the identification information of the external electronic device to the external server device based on the information of the channel through which the at least one ADV packet is received, in response to determining the battery information indicates a high battery state.

6. The electronic device of claim 1, wherein when executed, the instructions cause the electronic device to:
transmit the identification information of the external electronic device and the location information of the electronic device to the external server device when the at least one ADV packet is received once, in response to determining setting of the electronic device indicates a high connection frequency; and
determine whether to upload the identification information of the external electronic device based on at least one of the information of the channel through which the at least one ADV packet is received, in response to determining the setting of the electronic device indicates a low connection frequency.

7. The electronic device of claim 1, further comprising a sensor circuit, wherein when executed, the instructions cause the electronic device to acquire the location information of the electronic device using the sensor circuit.

8. The electronic device of claim 1, wherein the at least one ADV packet includes at least one of the identification information of the external electronic device, congestion information, importance information, or battery information.

9. The electronic device of claim 8, wherein when executed, the instructions cause the electronic device to:
determine whether the congestion information, the importance information, or the battery information satisfies an exception condition;
transmit the identification information of the external electronic device and the location information of the electronic device to the external server device when the at least one ADV packet is received, in response to determining the exception condition is satisfied; and
determine whether to upload the identification information of the external electronic device based on the information of the channel through which the at least one ADV packet is received, in response to determining the exception condition is not satisfied.

10. The electronic device of claim 9, wherein the exception condition is satisfied when at least one of:
the congestion information indicates low congestion;
the importance information indicates high importance; or
the battery information indicates low battery state.

11. A method for transmitting information of an external electronic device by an electronic device, the method comprising:
receiving at least one advertisement (ADV) packet from the external electronic device through short-range wireless communication;
determining whether to upload identification information of the external electronic device based on information of a channel through which the at least one ADV packet is received; and
transmitting the identification information of the external electronic device and location information of the electronic device to an external server device, in response to the determination to upload the identification information,
wherein the determining of whether to upload the identification information of the external electronic device includes determining to transmit the identification information of the external electronic device to the external server device in response to determining a number of channels through which the at least one ADV packet is received is equal to or greater than a specified number and a reception strength of the at least one ADV packet is equal to or greater than a specified strength.

12. The method of claim 11, further comprising identifying the number of channels through which the at least one ADV packet is received from a number of channels with a reception strength of the at least one ADV packet is equal to or greater than a specified strength.

13. The method of claim 11, wherein the at least one ADV packet comprises information of the external electronic device including importance information of the external electronic device, and
wherein the determining of whether to upload the identification information of the external electronic device includes:
determining to transmit the identification information of the external electronic device to the external server device in response to determining the importance information indicates high importance; and
determining to transmit the identification information of the external electronic device to the external server device based on the information of the channel through which the at least one ADV packet is received, in response to determining the importance information indicates low importance.

14. The method of claim 11, wherein the at least one ADV packet comprises information of the external electronic device including congestion information, and
wherein the determining of whether to upload the identification information of the external electronic device includes:
determining to transmit the identification information of the external electronic device to the external server device in response to determining the congestion information indicates a low congestion; and
determining to transmit the identification information of the external electronic device to the external server device based on the information of the channel through which the at least one ADV packet is received, in response to determining the congestion information indicates a high congestion.

15. The method of claim 11, wherein the at least one ADV packet comprises information of the external electronic device including battery information, and
wherein the determining of whether to upload the identification information of the external electronic device includes:
determining to transmit the identification information of the external electronic device to the external server device in response to determining the battery information indicates a low battery state; and
determining to transmit the identification information of the external electronic device to the external server device based on the information of the channel through which the at least one ADV packet is received, if the battery information indicates a high battery state.

16. The method of claim 11, further comprising:
transmitting the identification information of the external electronic device and the location information of the electronic device to the external server device when the at least one ADV packet is received once, in response to determining setting of the electronic device indicates a high connection frequency; and determining whether to upload the identification information of the external electronic device based on at least one of the information of the channel through which the at least one ADV packet is received, in response to determining the setting of the electronic device indicates a low connection frequency.

17. The method of claim 11, wherein the short-range wireless communication includes Bluetooth low energy (BLE) communication.

18. The method of claim 11, wherein the at least one ADV packet includes at least one of the identification information, congestion information, importance information, or battery information of the external electronic device.

19. The method of claim 18, wherein the determining of whether to upload the identification information of the external electronic device includes:
  determining whether the congestion information, the importance information, or the battery information satisfies an exception condition;
  determining to transmit the identification information of the external electronic device and the location information of the electronic device to the external server device when the at least one ADV packet is received, in response to determining the exception condition is satisfied; and
  determining whether to upload the identification information of the external electronic device based on the information of the channel through which the at least one ADV packet is received, in response to determining the exception condition is not satisfied.

20. The method of claim 19, wherein the exception condition is satisfied when at least one of:
  the congestion information indicates low congestion,
  the importance information indicates high importance, or
  the battery information indicates low battery state.

* * * * *